United States Patent [19]

Prevender

[11] 4,198,740
[45] Apr. 22, 1980

[54] METHOD FOR FORMING OR BONDING A LINER

[75] Inventor: Thomas S. Prevender, Albuquerque, N. Mex.

[73] Assignee: The United States of America as represented by the United States Department of Energy, Washington, D.C.

[21] Appl. No.: 927,237

[22] Filed: Jul. 24, 1978

[51] Int. Cl.² .............................................. B23P 17/00
[52] U.S. Cl. .................................. 29/421 R; 29/523; 72/54
[58] Field of Search .................. 29/421 R, 523; 72/54

[56] References Cited

U.S. PATENT DOCUMENTS

| | | | |
|---|---|---|---|
| 714,903 | 12/1912 | Hinds | 29/421 R |
| 2,263,714 | 11/1941 | Bloomfield et al. | 29/421 R X |
| 2,487,257 | 11/1949 | Morgan | 29/421 R UX |
| 2,982,360 | 5/1961 | Morton et al. | 29/523 UX |

Primary Examiner—Charlie T. Moon
Attorney, Agent, or Firm—R. V. Lupo; Dudley W. King; Robert Southworth, III

[57] ABSTRACT

A process and means for forming or bonding a liner to a shell or element wherein the liner is filled with or immersed in water and a portion of the water is frozen.

6 Claims, 4 Drawing Figures

METHOD FOR FORMING OR BONDING A LINER

FIELD OF THE INVENTION

The invention relates to forming or bonding a liner to a shell or element.

BACKGROUND OF THE INVENTION

Often it is desired to bond a thin liner to the interior of a shell. Various methods such as shrink fitting, explosive bonding or gluing are utilized to accomplish this. These methods suffer from various drawbacks such as lack of simplicity, lack of reproducibility, and possibly inoperability especially when used to bond a very thin liner such as a 0.010 inch aluminum liner into a steel shell.

Another method, known as hydroforming, is exemplified in U.S. Pat. No. 2,633,414 to Boivinet. Here a liner is deformed in a shell using a pump to apply fluid pressure to the shell. This suffers the disadvantage of requiring an expensive high-pressure pump. In addition, the differential thermal expansion of the material of the shell and liner is not utilized to increase the bonding forces. In use, repeated temperature cycling may cause the failure of the shell-liner bond and their subsequent delamination.

SUMMARY OF THE INVENTION

In view of the difficulties and disadvantages as noted above, it is an object of this invention to provide a novel method and apparatus for bonding a liner to a shell.

It is a further object to provide a method for bonding or hydroforming without employing a fluid pump and its attendant disadvantages.

It is a still further object of this invention to provide a method of bonding a shell to a liner which is resistant to the effects of thermal cycling.

The invention comprises an improved method and apparatus for bonding a very thin aluminum or other ductile metal liner to a steel shell by filling the liner with water and then freezing at least a portion of the water to cause a generation of pressure and the deformation of the liner into contact with the shell.

BRIEF DESCRIPTION OF THE DRAWINGS

Other objects and advantages of the present invention will be apparent to those skilled in the art from the following description with reference to the appended claims wherein like numbers denote like parts and wherein:

DESCRIPTION OF THE PREFERRED EMBODIMENT

Figure 1:
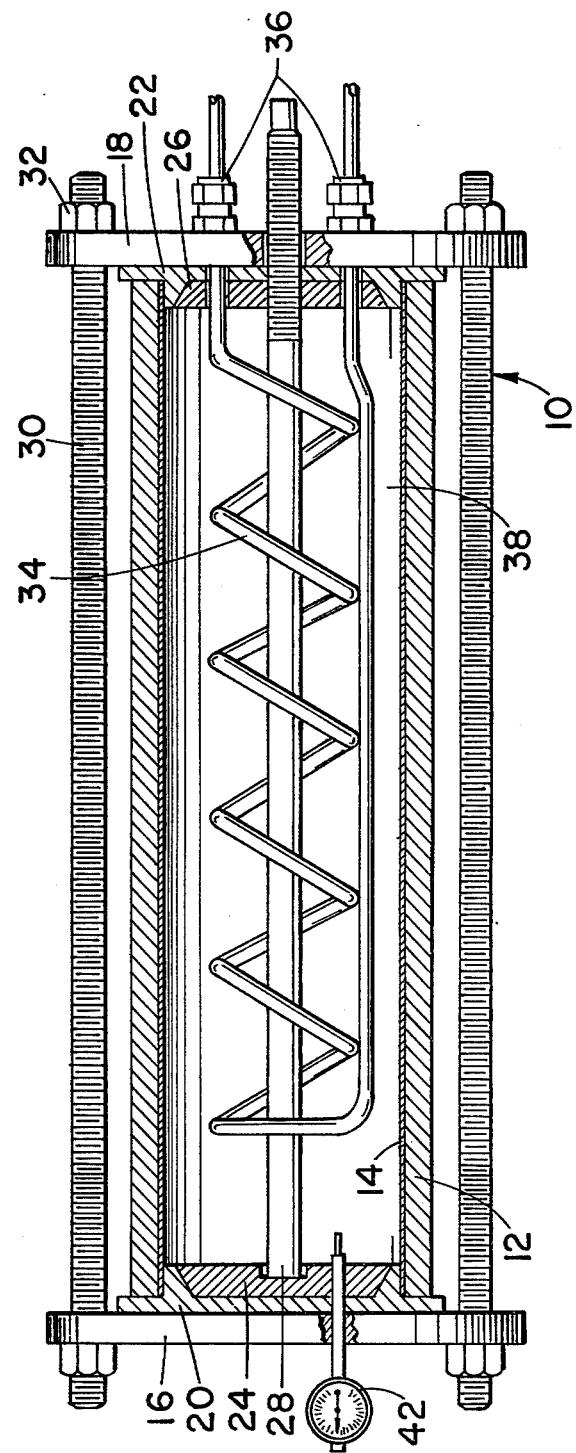
FIG. 1 illustrates in cross section the apparatus of the invention prior to bonding.

Reference is now made to FIG. 1 which illustrates in cross section, the apparatus of the invention prior to bonding. The apparatus 10 is adapted to bond an outer shell 12 to an inner liner 14. The outer shell may be relatively thick and of a relatively strong material such as steel, while the inner shell may be relatively thin and of a relatively ductile material such as aluminum.

In order to perform the bonding of the present invention, the inner shell is slipped into the outer shell. As can be seen in the enlarged section of FIG. 3, a gap 13 or space between the layers 12 and 14 facilitates this insertion. This gap may be about 0.020 inch, but if the gap is larger, the method of the invention need only to be repeated several times to close the gap and effect bonding.

The shell and liner are then placed between end plates 16 and 18 of the apparatus. By appropriately adjusting threaded rods 30 and nuts 32, the end plates are brought into close proximity to the ends of the shell and liner. Each end plate carries a gasket 20 or 22 for effecting a leak-tight seal between the end plate and the liner. By tightening jackscrew 28, pressure is applied to gaskets 20 and 22 through pressure plates 24 and 26 thereby expanding the gaskets in a radial direction to more tightly seal with the liner.

Cooling coil 34, passing through end plate 18, gasket 22, and pressure plate 26 and sealed to end plate 18 with tube fittings 36, provides a conduit for the circulation of refrigerant within the cavity 38 formed by the end plates and the liner.

The cavity is then filled with water through a hole in an end plate and the hole is plugged by inserting a pressure gage.

Figure 4:
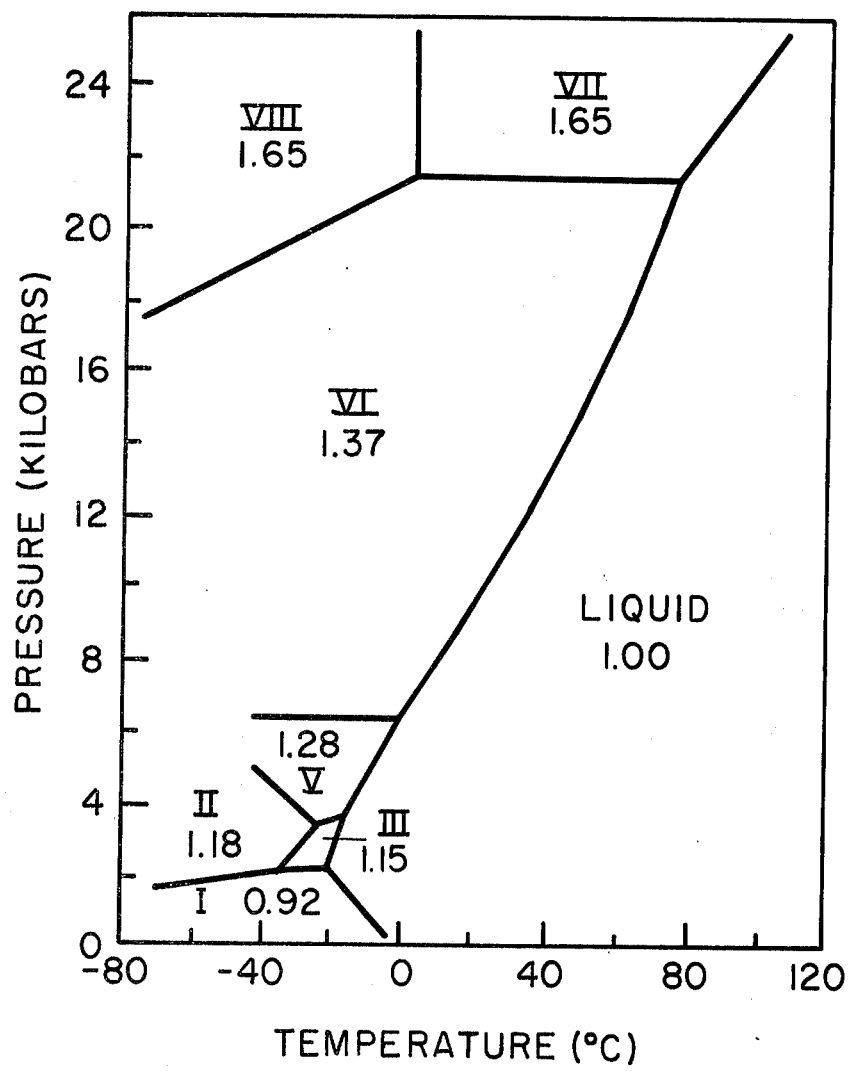
FIG. 4 illustrates a phase diagram of solid and liquid water.

Water has the unusual property of expanding upon freezing. As seen in FIG. 4, ice I (that form of solid water encountered at relatively low pressure) has a density of 0.92 as compared to that of 1.00 for liquid water. This means that if a portion of the water in cavity 38 is frozen, the pressure will be increased expanding the liner against the shell. This pressure may be increased to about two thousand atmospheres before the more dense allotropic forms of ice are formed.

Figure 2:
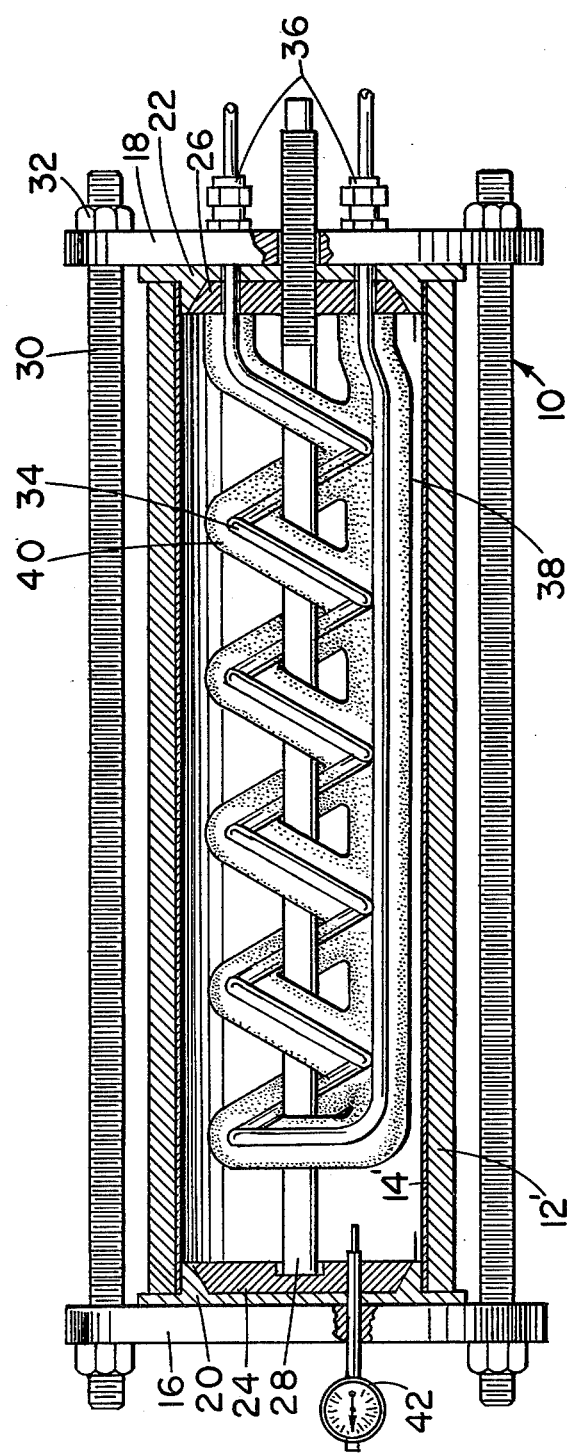
FIG. 2 illustrates in cross section the apparatus of the invention after bonding.
Figure 3:
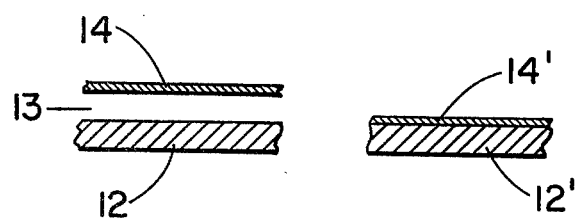
FIG. 3 illustrates in enlarged cross section the bonding of a shell and liner.

Referring now to FIG. 2, it is seen that as refrigerant is passed through the cooling coil, ice forms on the exterior of the coil causing an increase in pressure and thereby expanding and deforming the liner 14' into close contact with the shell 12' as seen in FIG. 3.

A suitable refrigerant has been found to be liquid nitrogen. It is simple to use, requiring no complicated auxiliary refrigeration equipment such as pumps, compressors, or heat exchangers. In addition, it is felt that by using a substance of this temperature ($-195°$ C.), the ice is formed on the walls of the cooling coil and not on the walls of the liner. This allows the remaining liquid water to uniformly transmit the pressure to all parts of the liner.

After the liner and shell are removed from the apparatus and warmed to room temperature, the shell grips the liner even more tightly due to the differential expansion of aluminum and steel. This synergistic effect combining the actions of hydroforming and shrink fitting is not observed in other bonding methods.

An alternative embodiment of the method of this invention would be to bond a sheath to the exterior of a body. In this case, the sheath is slipped over the body and the assembly is placed in a closed, water filled chamber. Upon freezing a portion of the water, a squeezing pressure is exerted which compresses the sheath into contact with the body.

EXAMPLE I

Bonding between a generally cylindrical steel shell and a thin aluminum liner was attempted by heat shrinking. Before the attempt, the steel case had an inside diameter of 5.625 inches at room temperature, the aluminum liner had an outside diameter of 5.625 inches with a 0.010 inch wall thickness at room temperature. The steel shell was heated to 400° F. by placing in a furnace to give a calculated inside diameter of 5.638 inches and the aluminum liner was cooled to −148° F. by the use of liquid nitrogen to give a calculated outside diameter of 5.612 inches. It was attempted to slip the liner into the shell, but the liner was seized by the shell before one third to one half its length was inserted. Further attempts to insert the shell only caused it to buckle and suffer irreparable damage. It was observed that this method would be dangerous to personnel handling the unwieldy and very hot or very cold pieces.

EXAMPLE II

Bonding between a generally cylindrical shell and a thin aluminum liner was attempted by hydroforming. In this case the steel shell had an inside diameter of 5.635 inches while the aluminum liner had an outside diameter of 5.625 inches with a 0.010 inch wall thickness. The aluminum liner was coated with an epoxy glue before being inserted into the steel shell. A bladder was placed inside the aluminum liner, and pressurized with gas to 200 psi so as to expand the aluminum liner against the steel case while the epoxy glue cured. A successful bond was made, but this bond later failed in thermal cycle testing.

EXAMPLE III

Bonding between a generally cylindrical shell and a thin aluminum liner was performed by combination heat shrinking/hydroforming in the apparatus illustrated in FIGS. 1 and 2. The steel shell was generally cylindrical with a length of four feet and an inside diameter which varied from four inches to 5.700 inches. The aluminum liner had a wall thickness of 0.010 inch and the same general contour as the steel shell but with a reduced diameter so as to provide a clearance of 0.020 inch.

The aluminum liner was inserted into the steel shell. The open ends of the cylinders were plugged and the assembly was clamped between two end plates. The interior cavity of the aluminum liner was filled with water before the cavity was hermetically sealed. Liquid nitrogen was passed through a copper coil immersed in the water to cause a portion of the water to freeze until the internal pressure was observed to reach 1000 psig. The ice was then allowed to melt and the apparatus was disassembled.

Upon inspection, the aluminum liner was found to have successfully formed to the contour of the steel shell. The steel shell tightly gripped the liner during repeated temperature cycling from −60° F. to 165° F.

The various features and advantages of the invention are thought to be clear from the foregoing description. However, various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. The method of firmly bonding a relatively ductile metal liner to a steel element comprising placing said liner and said element in assembled relationship with one closely encircling the other, providing a confined water bath against said liner, thereafter initially freezing (at least) only a central portion of said water bath while so confined to thereby increase the pressure of peripheral portion of unfrozen (said) water against said liner and plastically deform the liner into firm engagement with said steel element, whereby said increase in pressure is transmitted uniformly through said peripheral portion of unfrozen water.

2. A method of bonding a thin aluminum liner to an outer steel shell comprising providing a steel shell having a first interior cavity, placing within said first interior cavity a closely fitting aluminum liner having a second interior cavity, filling said second interior cavity with water, initially freezing (at least) only a central portion of said water to cause an increase of pressure in peripheral portion of unfrozen (said) water thereby forcibly plastically expanding the aluminum liner into firm engagement with the steel shell, whereby upon warming said aluminum and said steel shell are urged into more firm engagement by the differential expansion of aluminum and steel.

3. The method of claim 2 wherein said aluminum liner is generally cylindrical and about 0.010 inch thick.

4. The method of claim 2 wherein said pressure is up to about 2 kilobars.

5. The method of claim 2 wherein said freezing is performed by refrigerant means immersed in said water.

6. The method of claim 5 wherein said refrigerant means comprises liquid nitrogen.

* * * * *